(12) United States Patent
Szydelko (10) Patent No.: US 12,071,243 B2
(45) Date of Patent: Aug. 27, 2024

(54) TABLE PANEL FOR AN AIRCRAFT PASSENGER SEAT

(71) Applicant: ZIM AIRCRAFT SEATING GMBH, Immenstaad am Bodensee (DE)

(72) Inventor: Lukasz Szydelko, Schwäbisch Hall (DE)

(73) Assignee: Zim Aircraft Seating GmbH, Immenstaad am Bodensee (DE)

( * ) Notice: Subject to any disclaimer, the term of this patent is extended or adjusted under 35 U.S.C. 154(b) by 91 days.

(21) Appl. No.: 17/821,913

(22) Filed: Aug. 24, 2022

(65) Prior Publication Data
US 2022/0402614 A1    Dec. 22, 2022

Related U.S. Application Data (63) Continuation of application No. PCT/EP2021/055334, filed on Mar. 3, 2021.

(30) Foreign Application Priority Data

Mar. 5, 2020 (DE) ...................... 10 2020 106 028.9

(51) Int. Cl.
    *B64D 11/06* (2006.01)
(52) U.S. Cl.
    CPC ................. *B64D 11/0638* (2014.12)
(58) Field of Classification Search
    CPC ..... B60N 3/004; B64D 11/0638; A47C 7/628; A47C 7/70

(Continued)

(56) References Cited

U.S. PATENT DOCUMENTS

| | | | | | |
|---|---|---|---|---|---|
| 3,773,381 | A | * | 11/1973 | Brennan | B29C 31/004 |
| | | | | | 108/45 |
| 4,159,071 | A | * | 6/1979 | Roca | A47C 7/70 |
| | | | | | 108/42 |

(Continued)

FOREIGN PATENT DOCUMENTS

| | | |
|---|---|---|
| DE | 198 20 732 C1 | 9/1999 |
| DE | 103 58 478 A1 | 7/2005 |

(Continued)

OTHER PUBLICATIONS

German Search Report (Application No. 10 2020 106 028.9) dated Feb. 14, 2021.

(Continued)

*Primary Examiner* — Jose V Chen
(74) *Attorney, Agent, or Firm* — BURR PATENT LAW, PLLC (57) ABSTRACT

A table panel for an aircraft passenger seat, wherein the table panel comprises a panel component having two mutually opposite main sides, wherein the main sides are delimited by a component periphery having straight peripheral portions. The panel component has a multiplicity of mutually separated material clearances so that the panel component has a reduced mass in relation to a solid material panel that in terms of the thickness and the footprint area corresponds to the panel component and has an initial volume of the solid material, wherein the material clearances are in each case open in relation to the main side of the panel component, and wherein the sum of the volumes of all material clearances in the panel component result in a clearance volume of the panel component, wherein the clearance volume of the panel component is at least 20 percent of the initial volume.

17 Claims, 5 Drawing Sheets

(58) Field of Classification Search
USPC .......................................................... 297/146
See application file for complete search history.

(56) References Cited

U.S. PATENT DOCUMENTS

| | | | | |
|---|---|---|---|---|
| 5,443,018 | A * | 8/1995 | Cromwell | B60N 3/004 108/44 |
| 5,876,092 | A | 3/1999 | An | |
| 6,454,349 | B1 * | 9/2002 | Konya | B64D 11/0638 297/146 |
| 6,761,398 | B2 * | 7/2004 | Bentley | B61D 33/0007 297/165 |
| 7,281,762 | B1 * | 10/2007 | Getfield | B60N 3/004 297/188.05 |
| 7,621,593 | B2 * | 11/2009 | Dickinson | B60N 3/004 297/188.05 |
| 8,905,470 | B2 * | 12/2014 | Shih | B60N 3/004 297/146 |
| 2002/0170470 | A1 | 11/2002 | Cheng | |
| 2003/0159628 | A1 * | 8/2003 | Salzer | B61D 37/00 108/115 |
| 2008/0252109 | A1 | 10/2008 | Salzer et al. | |
| 2009/0188881 | A1 * | 7/2009 | Travis | B62B 9/26 211/132.1 |
| 2015/0061327 | A1 * | 3/2015 | Millan | B60N 3/004 297/163 |
| 2015/0203207 | A1 | 7/2015 | Bamford et al. | |
| 2016/0272326 | A1 | 9/2016 | Garing | |
| 2017/0355465 | A1 * | 12/2017 | Trimble | B60N 3/004 |
| 2018/0111533 | A1 * | 4/2018 | Johnson, Jr. | B60N 3/004 |
| 2018/0222592 | A1 | 8/2018 | Tiwari et al. | |
| 2018/0281299 | A1 * | 10/2018 | Maslakow | B29D 24/002 |
| 2019/0233122 | A1 * | 8/2019 | Maslakow | B32B 3/266 |
| 2020/0114939 | A1 * | 4/2020 | Le Corre | B60N 3/001 |

FOREIGN PATENT DOCUMENTS

| | | |
|---|---|---|
| GB | 2 541 660 A | 3/2017 |
| WO | 2014/075040 A1 | 5/2014 |
| WO | 2015/143021 A1 | 9/2015 |
| WO | 2016/038554 A2 | 3/2016 |
| WO | 2017/147620 A1 | 8/2017 |

OTHER PUBLICATIONS

International Search Report and Written Opinion (Application No. PCT/EP2021/055334) dated Jun. 17, 2021 (with English translation).

* cited by examiner

TABLE PANEL FOR AN AIRCRAFT PASSENGER SEAT

CROSS REFERENCE TO RELATED APPLICATIONS

This application is a continuation of International Application No. PCT/EP2021/055334 filed Mar. 3, 2021, which designated the United States, and claims the benefit under 35 USC § 119(a)-(d) of German Application No. 10 2020 106 028.9 filed Mar. 5, 2020, the entireties of which are incorporated herein by reference.

FIELD OF THE INVENTION

The present invention relates to a table panel for an aircraft passenger seat.

BACKGROUND OF THE INVENTION

Aircraft passenger seats, or seat rows usually having a plurality of aircraft passenger seats, respectively, for equipping aircraft for transporting passengers, such as passenger aircraft, are known in a multiplicity of embodiments. A seat area of an aircraft passenger seat has a seat base and a backrest, wherein two or more aircraft passenger seats are typically connected in alignment next to one another so as to form a seat row.

In the basic design of an aircraft passenger seat, it has to be taken into account that a high level of comfort in terms of use and operation is provided, for example, having various functions in the tightest space while meeting basic safety standards. Moreover, an effective use of resources is desirable from an economic and ecological point of view.

SUMMARY OF THE INVENTION

It is an object of the present invention to provide an improved aircraft passenger seat which is often an advantageous configuration, in particular, with a view to the comfort in terms of use and operation while taking into account economical aspects and safety standards.

The present invention proceeds from a table panel for an aircraft passenger seat, in particular, an aircraft passenger seat table panel, wherein the table panel comprises a panel component having two mutually opposite main sides, wherein the panel component at least substantially predefines a thickness dimension and a footprint area of the table panel, and wherein the main sides are delimited by a component periphery having straight peripheral portions. Such table panels are preferably composed of a plastics material, metal material or a composite material. The table panel is typically present as an add-on component on the rear side on an aircraft passenger seat, in particular, so as to be convertible from an upright storage position on the aircraft passenger seat to a horizontal use position, the latter for use by an aircraft passenger that sits in the seat row behind the respective passenger aircraft seat.

The core concept of the present invention lies in that the panel component has a multiplicity of mutually separated material clearances so that the panel component has a reduced mass in relation to a solid material panel that in terms of thickness and the footprint area corresponds to the panel component and has an initial volume of the solid panel material, wherein the material clearances are in each case open in relation to a main side of the panel component, and wherein the sum of the volumes of all material clearances in the panel component result in a clearance volume of the panel component, wherein the clearance volume of the panel component is at least 20 percent of the initial volume. The clearance volume is preferably material-free regions, optionally filled with gas, for example, filled with air. In this way, a weight reduced by at least 20 percent, or a smaller mass of the table panel, respectively, is achieved at a comparable stability of the table panel according to the present invention in comparison to the stability of the table panel without material clearances, or in comparison to the solid material table panel in the initial state, respectively. In the case of a multiplicity of, for example, several hundred aircraft passenger seats in a passenger aircraft, an economic advantage is achieved, or a significant weight saving is achieved for the aircraft, respectively, and an associated ecological advantage by virtue of the lower material consumption in comparison to a solid material table panel composed of an aluminum material, for example. The high mechanical stability of the table panel according to the present invention is achieved by the advantageously configured material clearances. A lower fuel consumption of the aircraft associated therewith by virtue of the weight savings leads to a further, in particular, ecological, advantage in terms of the improved energy footprint or overall ecological footprint, respectively.

The material clearances in the panel component are formed using comparatively thin walls of remaining material that are present between adjacent material clearances. A high stability of the table panel is achieved in this way. The walls of the material clearances that extend transversely to the main sides, or across the depth of the material clearances, respectively, in portions are preferably open in the manner of windows, thus are not closed in a planar manner, and are interrupted only by narrow material bridges. The material clearances advantageously form a type of honeycomb structure with comparatively many cavities and a few reinforcing material bridges in or of the panel component, respectively. The walls of the honeycombs, or of the cavity regions, respectively, formed by the material clearances, as a result of the remaining and in some instances thin or narrow wall portions and base portions of the material clearances, form material in regions which have an overall reinforcing effect in all spatial directions on the overall structure of the table panel according to the present invention.

The clearance volume of the material clearances of the panel component in total is preferably at least 30 percent of the initial volume, preferably at least 40 percent of the initial volume, preferably at least 50 percent of the initial volume, preferably at least 60 percent of the initial volume. The material clearances are preferably retroactively machined from a solid panel material which throughout the initial volume is formed by panel material, or is produced by subtractive machining such as by milled cutouts in the panel material, respectively. The material clearances are preferably closed, or devoid of any connection to the external narrow-side panel component periphery between the two planar sides or a main sides, respectively. The material clearances are elongate straight material clearances, for example. All material clearances are preferably separated by a material portion of the panel component, the material portion being, for example, a material breach. The panel component, for example, a casting or an injection-molded part, is preferably produced in integrally from a metal material, for example, from a light metal material.

A, or preferably each, material clearance has mutually opposite longitudinal walls which display a contoured shape. The contoured shape has, in particular, portions which project somewhat inward into the material clearance and regularly alternate with somewhat recessed portions. The material clearance moreover has a base having a flat base face, for example, the latter being preferably parallel to the planar external sides or main sides, respectively. The mutually opposite longitudinal walls are connected to one another by way of the base face.

The material clearances in a corresponding design embodiment are preferably present on both mutually opposite main sides of the panel component, but are laterally offset, or offset transversely to the longitudinal extent, respectively. At least a plurality of the material clearances on a first main side are aligned so as to be next to one another and parallel among one another. On the other opposite planar second external side or a main side of the panel component, respectively, the material clearances among one another are also parallel and run so as to correspond to the direction of the material clearances on the first main side, but are in each case laterally offset. In this way, it is ensured that the material clearances on the first main side and on the second main side do not overlap, or do not engage in one another, respectively. As a result of the contouring of the longitudinal peripheries, there are only this window-type voids in the walls of all material clearances.

In other words, the material clearances on the first main side are present in the stripe-shaped material-afflicted intermediate space between two adjacent material clearances of the material clearances on the other main side. In this way, the closed base of all material clearances can be implemented.

The material clearances are advantageously configured according to a pattern, the material clearances being, in particular, configured according to a regular pattern. For example, according to a pattern having parallel running material clearances in relation to a planar side, or a main side of the panel component, respectively. A plurality of parallel material clearances are preferably present on a main side of the panel component. The parallelism of the material clearances is formed in one region, for example, in one half, and a further parallelism of a plurality of material clearances is formed on the other half. The pattern can be a regular pattern, or a pattern which is symmetrical in relation to the main sides, respectively, for example, be configured as a herringbone pattern, or be of an irregular design.

The pattern formed by the material clearances means, in particular, that there are repetitive structures, or the latter are in the regular arrangement, respectively. The material clearances are preferably retroactively machined, for example, milled, from the panel solid material. The panel component in the basic shape is preferably quadrangular having two first and two second mutually opposite straight or mutually parallel peripheral portions, respectively. A depth of the material clearances in the direction of the thickness dimension of the panel component is preferably somewhat less than a thickness of the panel component. The material clearances in the longitudinal direction run up to a straight peripheral portion, so as to terminate at a close spacing from the latter. The material clearances preferably differ from one another in terms of the length of the extent in the longitudinal direction of the respective material clearance. The pattern comprises, for example, at least approximately straight, or linearly aligned, or elongate or line-shaped or angled narrow groove-type material clearances, respectively. A base of the respective material clearance is maintained, for example, with the base having a thickness in the range of millimeters. That side of the base that faces the material clearance has an opposite side which forms part of the remaining region, or a region not milled, of the other main side of the panel component, respectively.

It is also advantageous for a plurality of material clearances which are elongate in terms of the footprint shape to be provided. This is, particularly, advantageous in terms of the manufacturing process.

The pattern formed by the material clearances comprises, for example, linearly aligned, or at least approximately elongate, or line-shaped narrow groove-type material clearances, respectively. The material clearances among one another preferably have the same shape, or an identical width dimension, respectively. The material clearances in terms of the design embodiment are preferably identical among one another. Adjacent material clearances in terms of the length are typically dissimilar, or are in each case a function of the longitudinal alignment relative to the peripheral portions, respectively. For example, on one main side of the panel component eight or nine material clearances which are parallel among one another are present on a first half of the main side, and eight or nine material clearances which are parallel among one another are present on the second main side.

When viewed in the longitudinal direction, the material clearances are preferably aligned obliquely in relation to mutually opposite straight peripheral portions of the component periphery.

Between two adjacent material clearances, thus open locations of the main side, a surface region of the main side is present so as to be planar, or closed, respectively, in the width of one material clearance.

One advantageous variant is distinguished in that the material clearances in the longitudinal direction of the respective material clearance are aligned so as to be angled in relation to a straight peripheral portion of the component periphery. This contributes toward a high mechanical stability of the panel component.

A straight peripheral portion of the component periphery extends across a length and/or a width of the panel component.

Alternatively, it is advantageous for the material clearances to be open toward both mutually opposite main sides of the panel component. This variant of configuration of the panel component which is continuously perforated or slotted in the thickness direction of the panel component represents an alternative to the material clearances which are provided with the remaining base and are open toward exactly one main side, or an alternative to the unilaterally closed material recesses on one side on a main side, and other material clearances which on the other main side are open toward the latter. In principle, both variants can also be implemented on one panel component.

Another advantageous configuration results in that a main side comprises two regions, wherein a first region has a plurality of first material clearances which are identically aligned among one another, and wherein the second region has a plurality of second material clearances which are identically aligned among one another, wherein the alignment of the material clearances in the first region differ as from the alignment of material clearances in the second region.

A plurality of parallel material clearances of dissimilar length are preferably present on a first half of a main side of the panel component, the material clearances in the longitudinal direction preferably running in each case up to a component periphery so as to terminate at a close spacing from the latter, for example, at a spacing of several millimeters. A plurality of parallel material clearances of dissimilar length are likewise on the other, or the second half, respectively, of the same main side of the panel component, the material clearance is in the longitudinal direction running each case up to a component periphery so as to terminate at close spacing from the latter, wherein the longitudinal direction of the material clearances on the first half are aligned so as to be angled in relation to the longitudinal direction of the material clearances on the second half, preferably so as to be at an angle of approximately 90 degrees. In this way, a type of herringbone structure results on the respective main side of the panel component.

The opposite main side of the panel component preferably has a corresponding structure of the material clearances. The material clearances on the one main side of the panel component are preferably parallel to the respective opposite material clearances on the respective region on the other, or opposite main side, respectively, of the panel component. The material clearances in relation to the opposite main side are preferably transversely offset to the opposite main side by the width of the respective material clearances which among one another are preferably of identical width in relation to the extent of the main plain. In this way, regional planar regions are preserved on both external main sides, the planar regions externally being part of the original main side across the full area.

It is advantageous for the material clearances to be free of material. The material clearances are preferably not retroactively filled with a solid material, for example, or are merely filled with a gas such as air, for example. Alternatively, individual or all material clearances may be filled, for example, foamed.

It is also advantageous for a plurality of material clearances to be present on each of the two mutually opposite main sides of the panel component. In this way, a significant reduction in weight and at the same time a high stability of the component can be achieved.

The material clearances in terms of the depth, or in the direction of the thickness dimension of the table panel, respectively, in relation to the respective main side preferably do not reach as far as the opposite main side, thus have a remaining base. The thickness of the remaining base is preferably uniformly between 5 and 15 percent of the thickness of the panel component, for example.

According to one advantageous modification, a main side has a planar covering, both main sides preferably having a covering such as a cover element, for example. As a result, a uniformly compact surface is formed, in particular, while covering the material clearances. In this way, a compact flat utility face on the table panel is provided for the expedient use as a table panel.

Accordingly, the panel component forms a base element of the complete table panel. In the case of the completed table panel, the covering or cover, which is thin and compact in a planar manner, for example, is applied, for example, adhesively bonded thereto, in addition to the panel component having the material clearances. The material, or the weight of the covering, respectively, accounts for only a minute fraction of the total of the material removed from the panel component in accordance with the material clearances.

Both mutually opposite main sides of the panel component preferably have a covering.

It is moreover advantageous for an attachment portion for attaching a fitting to be provided on the table panel, wherein the fitting is configured for movably mounting the table panel on a receptacle. In this way, the table panel by way of the fitting can be attached, preferably so as to be movable in an articulated manner, to a receptacle for the table panel, such as a casing of the aircraft passenger seat, for example. In this way, the table panel on the rear side of the associated aircraft passenger seat can be moved to a space-saving and folded-up stowage position on the casing, or be reversibly moved to a use position horizontally aligned in relation to the rear side of the aircraft passenger seat, for example.

It is advantageous for two separate panel components that are connected to one another in an articulated manner to be present. The two panel components form the table panel, or are a two-part variant of the panel component, respectively. In this way, the utility face of the table panel can be chosen in a variable manner.

A first panel component and a second panel component are preferably connected to one another in an articulated manner, wherein the first panel component has a fitting or attachment means, respectively, for attaching the table panel to a receptacle portion of an aircraft passenger seat, such as a rear side of an aircraft passenger seat. Articulated means are preferably present between the first and the second panel component, wherein an articulation axis of the articulation means is aligned so as to be parallel to the respective mutually facing peripheries of the two panel components. In this way, the two panel components can be folded over so as to lie on top of one another and moved to a folded-up mutually aligned flat orientation, as is the case in customary folding tables of aircraft passenger seats.

The present invention moreover relates to an aircraft passenger seat having a table panel according to one of the design embodiments discussed above.

In this way, the advantages described can be implemented on the aircraft passenger seat.

BRIEF DESCRIPTION OF THE DRAWINGS

Further features and advantages of the invention are explained in more detail hereunder by means of a schematically illustrated exemplary embodiment.

DETAILED DESCRIPTION OF THE INVENTION

Figure 1:
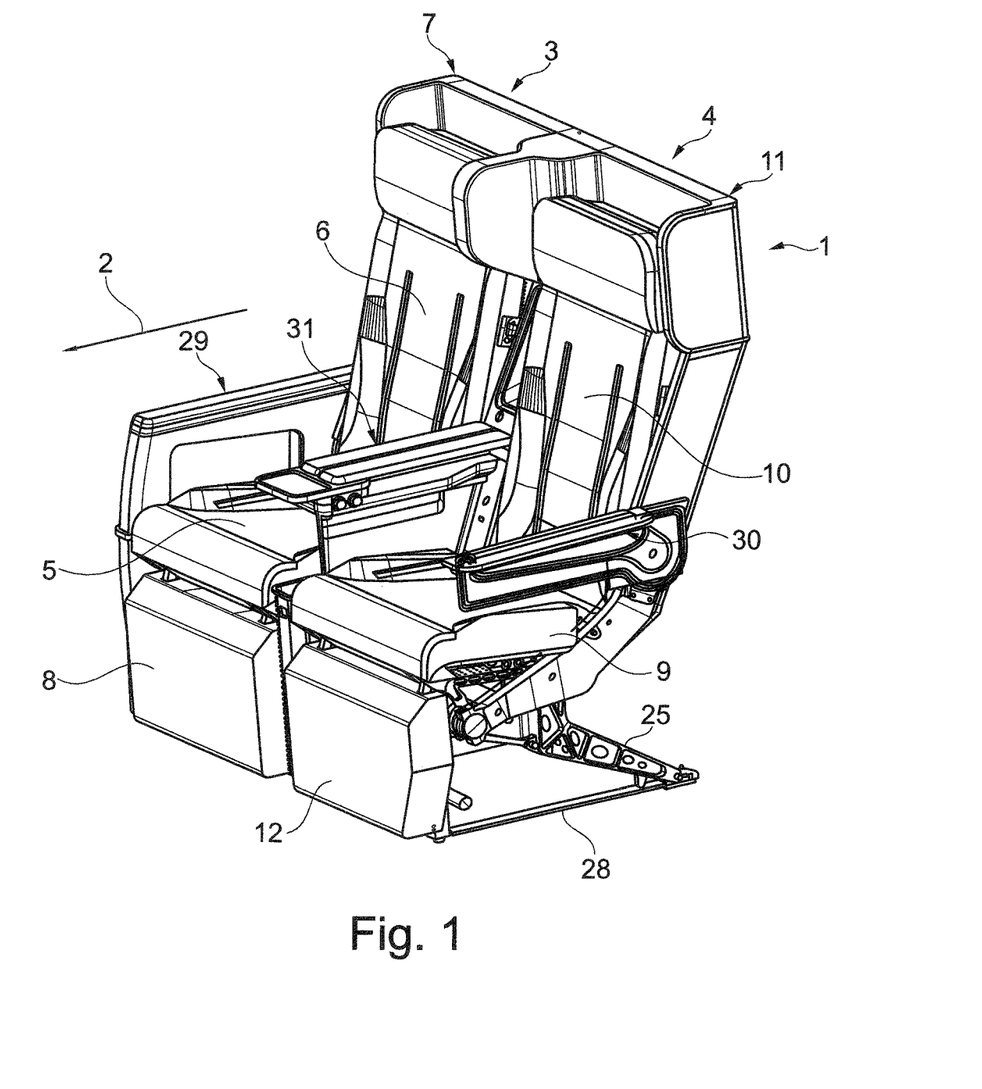
FIG. 1 in a perspective view obliquely from the front shows a seat row having two aircraft passenger seats comprising a seat base, a backrest including a rear-side casing and a leg rest.

FIG. 1 shows a seat row 1 with a seating direction 2, having two aircraft passenger seats 3 and 4. The indications hereunder pertaining to positions and directions such as front, rear, top and bottom refer to the seating direction 2 and to the use a state of the seat row 1.

Both aircraft passenger seats 3 and 4 are of a corresponding construction. The aircraft passenger seat 3 has a seat base 5, a backrest 6 and on the rear side of the backrest 6 a casing 7. A preferably folding leg rest 8 which is able to be folded about a horizontal axis is present so as to adjoin the forward end region of the seat base 5.

Accordingly, the aircraft passenger seat 4 comprises a seat base 9, backrest 10, casing 11 and a leg rest 12.

The seat bases 5, 9, the backrests 6, 10 and the leg rests 8, 12 comprise a preferably ergonomically shaped upholstery.

The aircraft passenger seats 3 and 4 by way of two support legs 13 and 14 are able to be assembled on a cabin floor of an aircraft cabin of an associated aircraft.

For this purpose, the support leg 13 on the lower end region 16 of a front strut 15 has an assembly location 17, and a further assembly location 20 on a lower end region 19 of a rear strut 18. A bracing element 21 is provided between the end regions 16 and 19.

The support leg 14 on the lower end region 23 of a front strut 22 has an assembly location 24, and a further assembly location 27 on the lower end region 26 of the rear strut 25. A bracing element 28 is provided between the end regions 23 and 26.

The seat row 1 laterally on the aircraft passenger seat 3 moreover has an outer armrest 29 and laterally on the aircraft passenger seat 4 for an outer armrest 30. Console 31 which can likewise be used as an armrest by an aircraft passenger is present between the two aircraft passenger seats 3 and 4, preferably at the height level of the two outer armrests 29 and 30.

Figure 2:
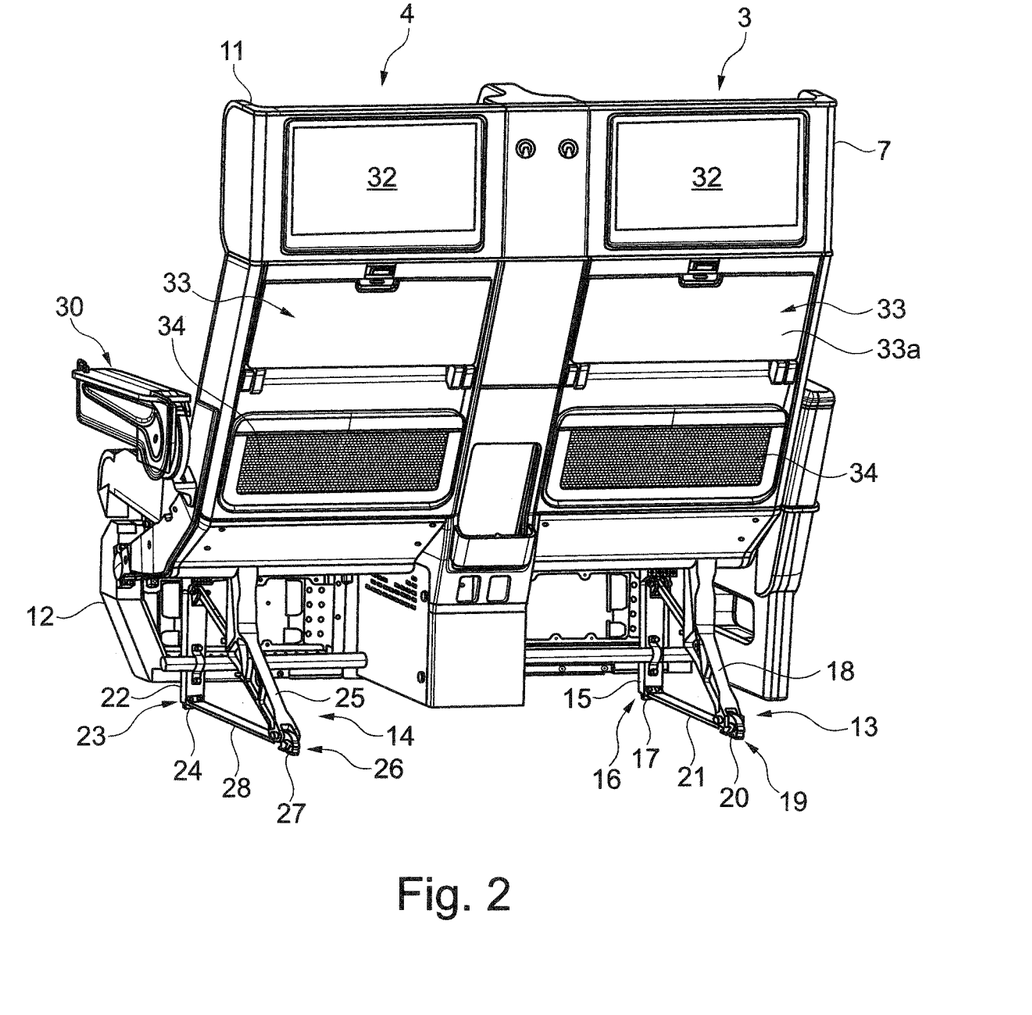
FIG. 2 shows the seat row according to FIG. 1 in a perspective view obliquely from the rear.

Disposed in a shell shape of the respective casing 7 or 11, respectively, is the respective associated backrest 6 or 10, respectively. The backrest 6 or 10, respectively, for adjusting different tilted positions is preferably guided so as to be movable in the casing 7 or 11, respectively, for example, conjointly with the associated seat base 5 or 9, respectively, which is displaceably mounted.

The casings 7 and 11 are provided with further elements, for example, provided in each case with additional functions on the rear side. For example, a multimedia unit 32 for digital media is in each case provided in an upper region of the rear side of the casings 7, 11, the multimedia unit 32 having an electronic input and output device, or having a touchscreen, for example.

For example, a folding table panel 33 for the respective aircraft passenger seat 3 and 4 is configured like a tablet table in a region adjoining below the multimedia unit 32, or in a central region, respectively. The table panels 33 in FIG. 2 are illustrated in a stowage position or out-of-use position, respectively, in which the table panels 33 are folded up so as to be vertically upright and secured.

A stowage compartment 34, for example, for storing magazines or brochures or other items is present below the respective folding table panel 33.

The table panel 33 is explained in more detail hereunder with reference to the aircraft passenger seat 3, wherein the table panel 33 on the aircraft passenger seat 4 is of an identical construction.

Figure 3:
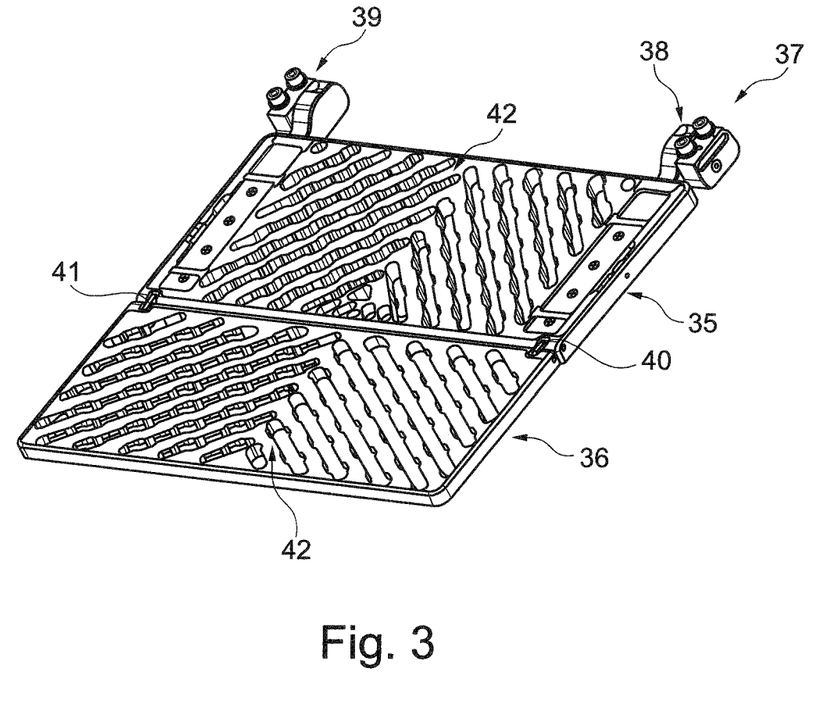
FIG. 3 shows two panel components, connected in an articulated manner, of a table panel for the aircraft passenger seats according to FIGS. 1 and 2 without cover elements on the panel components, and having a fitting.

The table panel 33 which has an externally present planar covering 33a, such as a thin cover element, for example, as can be seen in FIG. 2, comprises two panel components which are connected in articulated manner and have a first panel component 35 and a second panel component 36.

Present is a fitting 37 having a fitting part 38 and a further fitting part 39 for disposing the table panel 33 so as to be able to be folded on the casing 7.

Moreover provided is an articulated assembly having an articulation member 40 and a further articulation member 41 for connecting the two panel components 35 and 36 in an articulated manner.

A multiplicity of mutually separated material clearances 42 are configured in the panel components 35 that are preferably produced from an originally solid panel material. The material clearances 42 have the effect that the panel components 35 and 36, respectively, each have a reduced mass in relation to a solid material panel that in terms of the thickness D and the footprint area corresponds to the panel components 35 and 36, respectively, and has an initial volume.

Figure 7:
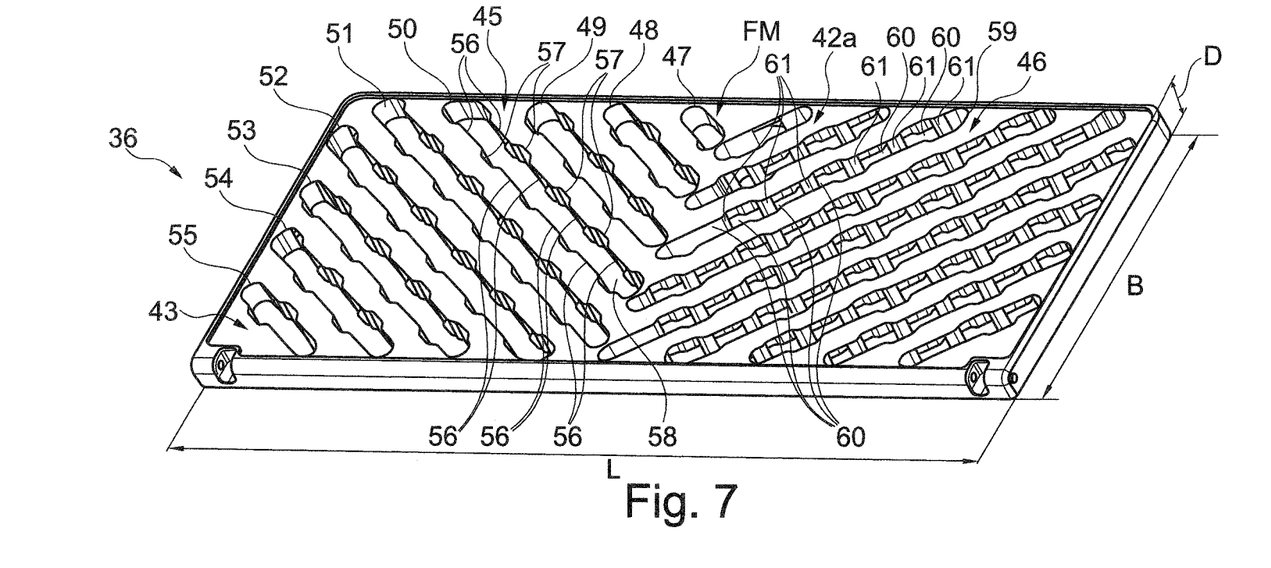
FIG. 7 shows a second panel component of the panel components according to FIG. 3, in a perspective illustration.
Figure 8:
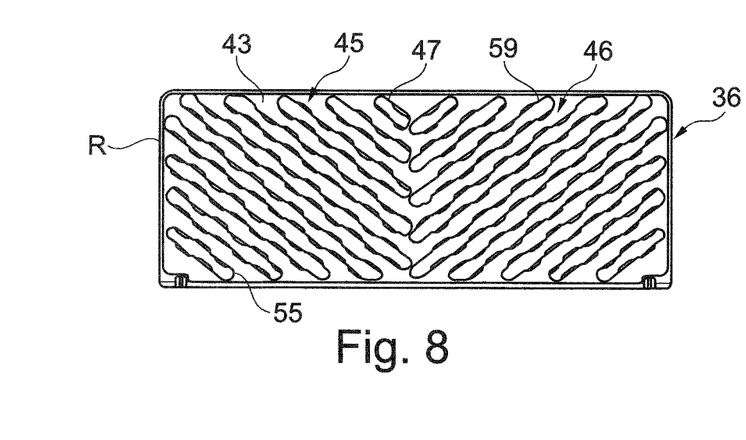
FIG. 8 shows the panel component according to FIG. 7 from above.
Figure 9:
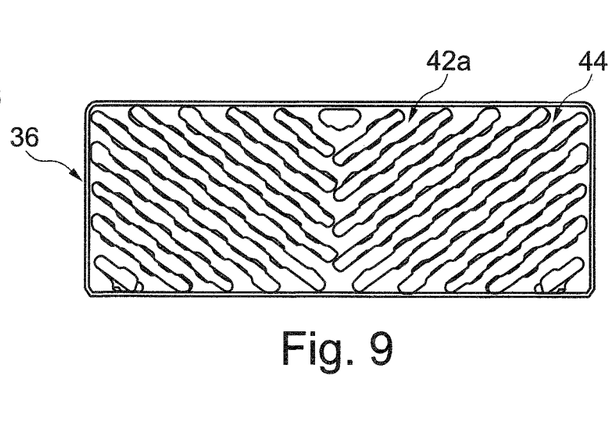
FIG. 9 shows the panel component according to FIG. 7 from below.

In terms of the panel component 36, the material clearances 42 are in each case open in relation to an upper-side main side 43 and an opposite lower-side main side 44 of the panel component 36, wherein the sum of the volume is of all material clearances 42 on both main sides 43, 44 in the panel component 36 result in a clearance volume of the panel component, wherein the clearance volume of the panel component is at least 20 percent of the initial volume of the corresponding material of the panel-shaped solid panel material used for producing the panel component 36.

The main sides 43, 44 are delimited by a component periphery R having in each case straight peripheral portions that are orthogonal to adjacent portions of the component periphery.

The clearances in the panel component 36 are formed solely by groove-shaped material clearances 42a which are identical among one another.

Figure 4:
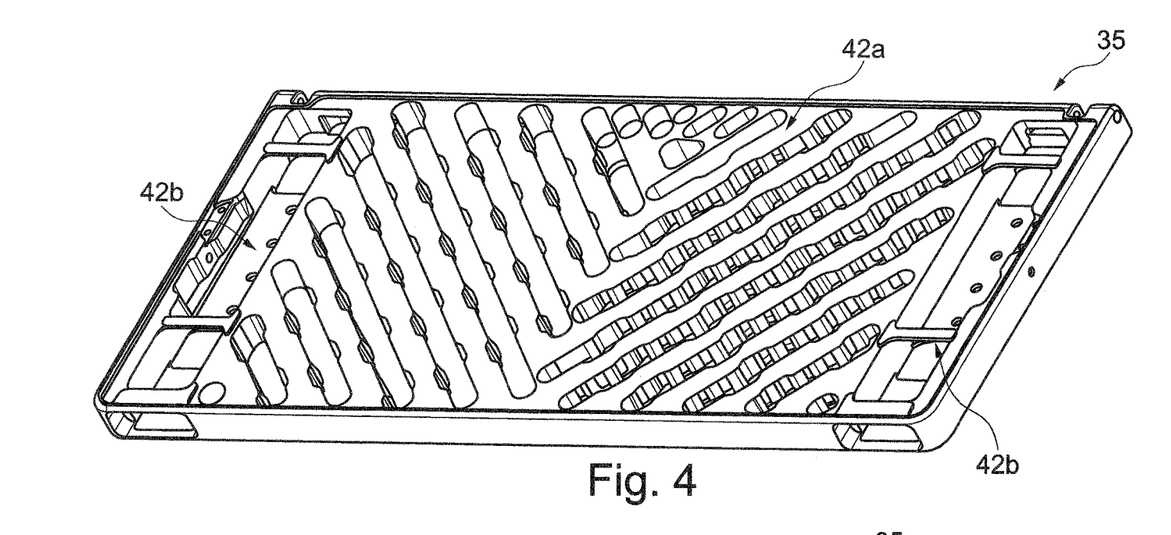
FIG. 4 shows a first panel component of the panel components according to FIG. 3 in a perspective illustration, without a fitting.

The material clearances 42 in the panel component 35 overall are formed by groove-shaped material clearances 42a which in terms of the basic shape are formed so as to correspond to the groove-shaped material clearances 42a of the panel component 36, and are additionally formed by further material clearances 42b which here are approximately rectangular and on both sides on mutually opposite lateral peripheral regions exist for attaching or accommodating, respectively, the fitting parts 38 and 39 in the panel component 35.

The advantageously substantial saving in terms of weight and material provided in the panel components 35, 36 is performed by the material clearances 42a and 42b. The material clearances 42a are explained hereunder by means of the panel component 36.

The panel component 36, which in terms of the outline is approximately rectangular, has a length L, a width B and a thickness D.

The main side 43 is divided into, for example, two regions 45 and 46, or halves, respectively, which presently by way of example are symmetrical and of identical size. The surface area of the two regions 45 and 46 is a result of the width B and half the length L, thus in each case a result of half the value of the overall surface area of the main side 43.

The material clearances 42a are configured according to a pattern, here in the manner of a herringbone pattern FM (see FIG. 7).

The common longitudinal alignment of the material clearances 47-55 in the first region 45 is accordingly dissimilar, or offset at an angle of 90 degrees in relation to the common longitudinal alignment of the mutually parallel material clearances and the second region 46, respectively.

The first region 45 has a plurality of first material clearances 42a, or 47-55, respectively, which are identically aligned among one another. The material clearances 42a in the first region 45 comprise the material clearances 47-55 which are in each case elongate and groove-shaped. The material clearances 47-55 are identical in terms of shape and are aligned in parallel among one another and differ from one another only in terms of the respective length of the material clearances 47-55.

The material clearances 42a in the second region 46 are mirror-symmetrical in relation to the material clearances 47-55, or are likewise all aligned in parallel among one another and are identical having in each case different lengths.

Each of material clearances 47-55 has mutually opposite longitudinal walls which display a contoured shape. The contoured shape on the material clearance 50 used by way of example has portions 56 which project somewhat into the material clearance, and portions 57 which are somewhat recess, the portions 56 and 57 being configured in an alternating manner in the longitudinal extent of the respective material clearance 47-55. Moreover, the material clearance 50 has a flat base 58 by way of which the mutually opposite longitudinal walls of the material clearance 50 are connected to one another.

Corresponding material clearances 42a are present on the opposite main side 44 of the panel component 36 (see FIG. 9), the material clearances 42a running so as to be parallel to the material clearances 47-55 in the region 45 and thus also parallel among one another, but so as to be in each case laterally offset so that the material clearances on the half of the main side 44 do not overlap, or are not mutually aligned, respectively, with the material clearances 47-55 on the half of the other main side 43.

In this way, the material clearances 42a in the region of the main side 44, the latter lying opposite the region 45 of the main side 43, are present in the stripe-shaped intermediate space between two adjacent material clearances of the material clearances 47-55. The closed base 58 of the material clearance 50 and of all other material clearances 47-49, 51-55 and of the material clearances on the main side 44 is able to be configured in this way.

The material clearances in the region 46 of the main side 43 and in the opposite region of the main side 44 are configured in an analogous manner.

Owing to the uniformly and identically contoured shape of the longitudinal walls of all material clearances 42a, or 47-55, respectively, on both main sides 43 and 44 of the panel component 36, having the portions 56 projecting into the respective material clearance and having the recessed portions 57, material voids, or window-type material-free portions in the longitudinal walls of all material clearances, and in each case one material bridge between two adjacent material voids result in the panel component 36. By way of example for the material clearance 59 in the region 46 of the main side 43 (see FIG. 7), this results in alternating material voids 60 and material bridges 61.

The free or open material voids 60, respectively, in the longitudinal walls form a regular pattern in the longitudinal walls that alternates with the narrow remaining continuous material bridges 61 in the longitudinal walls. The material bridges 61 extend perpendicularly between the two main sides 43 and 44, wherein the material bridges 61 connect the two main sides 43 and 44.

The material voids 60 contribute toward the comparatively large proportion of the material volume that has been removed on the panel component 36 in comparison to the material of a panel-type panel component from solid material of corresponding thickness D and corresponding outline.

Moreover, the material bridges 61, despite the comparatively minor proportion thereof in terms of the overall mass of the panel component 36, contribute toward the mechanical stabilization or strengthening or reinforcement of the panel component 36, respectively.

Figure 5:
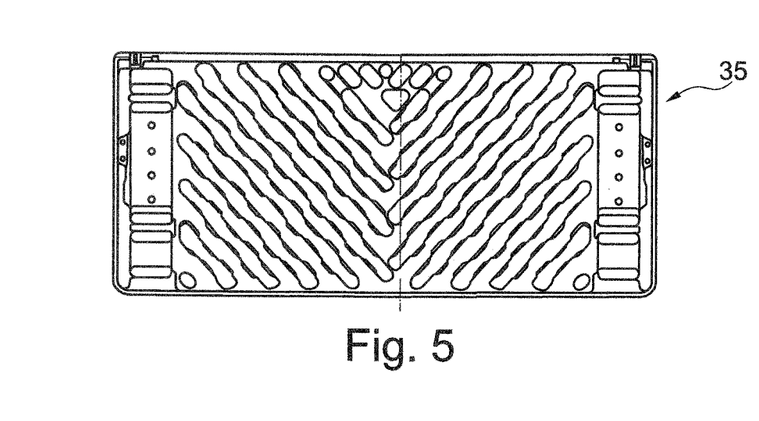
FIG. 5 shows the panel component according to FIG. 4 from above.
Figure 6:
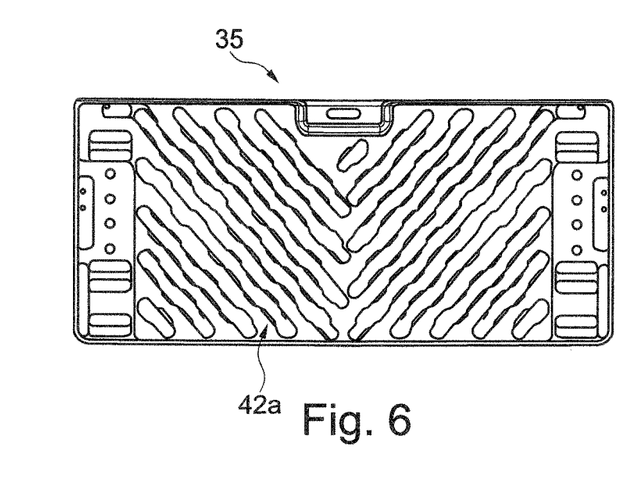
FIG. 6 shows the panel component according to FIG. 4 from below.

The panel component 35, with the exception of the material clearances 42b and the material clearances 42a which are shorter in some instances, is constructed in a manner corresponding to that of the panel component 36.

The panel component 35 in terms of the material clearances 42a is designed in an analogous manner.

The sum of the volumes of all material clearances 42a in the panel component 36 is at least $0.2 \times L \times B \times D$, or at least 20 percent of the initial volume of the solid material of a solid material panel having the overall volume, or material volume $L \times B \times D$, respectively.

LIST OF REFERENCE SIGNS

1 Seat row
2 Seating direction
3 Aircraft passenger seat
4 Aircraft passenger seat
5 Seat base
6 Backrest
7 Casing
8 Leg rest
9 Seat base
10 Backrest
11 Casing
12 Leg rest
13 Support leg
14 Support leg
15 Strut
16 End region
17 Assembly location
18 Strut
19 End region
20 Assembly location
21 Bracing element
22 Strut
23 End region
24 Assembly location
25 Strut
26 End region
27 Assembly location
28 Bracing element
29 Armrest
30 Armrest
31 Console
32 Multimedia unit
33 Table panel
33a Covering
34 Stowage compartment
35 Panel component
36 Panel component
37 Fitting
38 Fitting part
39 Fitting part
40 Articulated member
41 Articulated member
42 Material clearance
42a Material clearance
42b Material clearance
43 Main side
44 Main side
45 Region 46 Region
47-55 Material clearance
56 Portion
57 Portion
58 Base
59 Material clearance
60 Material void
61 Material bridge

The invention claimed is:

1. A table panel for an aircraft passenger seat comprising a panel component having two mutually opposite main sides, wherein the panel component at least substantially predefines a thickness dimension and a footprint area of the table panel, and wherein the main sides are delimited by a component periphery having straight peripheral portions, wherein the panel component has a multiplicity of mutually separated material clearances so that the panel component has a reduced mass in relation to a solid material panel that in terms of the thickness and the footprint area corresponds to the panel component and has an initial volume of the solid material, wherein the multiplicity of mutually separated material clearances are in each case open in relation to a main side of the panel component, and wherein a sum of the volumes of all material clearances in the panel component result in a clearance volume of the panel component, wherein the clearance volume of the panel component is at least 20 percent of the initial volume of the solid material, and wherein a main side comprises two regions, wherein a first region has a plurality of first material clearances which among one another are identically aligned, and wherein a second region comprises a plurality of second material clearances which among one another are identically aligned, wherein the alignment of the material clearances in the first region differs from the alignment of the material clearances in the second region.

2. The table panel as claimed in claim 1, wherein the material clearances are configured according to a regular pattern.

3. The table panel as claimed in claim 1, wherein a plurality of material clearances which are elongate in terms of the footprint shape are provided.

4. The table panel as claimed in claim 1, wherein the material clearances in the longitudinal direction of the respective material clearance are aligned so as to be angled in relation to a straight peripheral portion of the component periphery.

5. The table panel as claimed in claim 1, wherein the material clearances are open toward both mutually opposite main sides of the panel component.

6. The table panel as claimed in claim 1, wherein the material clearances are free of material.

7. The table panel as claimed in claim 1, wherein a plurality of material clearances are present on each of the two mutually opposite main sides of the panel component.

8. The table panel as claimed in claim 1, wherein a main side has a planar covering.

9. The table panel as claimed in claim 1, wherein an attachment portion for attaching a fitting is provided on the table panel, wherein the fitting is configured for movably mounting the table panel on a receptacle.

10. The table panel as claimed in claim 1, wherein two separate panel components that are connected to one another in an articulated manner are present.

11. An aircraft passenger seat having a table panel as claimed in claim 1.

12. The table panel as claimed in claim 1, wherein the multiplicity of mutually separated material clearances are angled in relation to a straight peripheral portion of the component periphery.

13. The table panel as claimed in claim 1, wherein the multiplicity of mutually separated material clearances are in a herringbone pattern.

14. The table panel as claimed in claim 1, wherein the plurality of first material clearances are elongate and groove-shaped and are aligned in parallel to each other and differ only in length.

15. The table panel as claimed in claim 14, wherein the plurality of second material clearances are elongate and groove-shaped and are aligned in parallel to each other and differ only in length.

16. The table panel as claimed in claim 1, wherein the alignment of the material clearances in the first region is offset at an angle of 90 degrees in relation to the alignment of the material clearances in the second region.

17. The table panel as claimed in claim 1, wherein each material clearance has mutually opposite longitudinal walls with a contoured shape including portions which project inward into the material clearance and regularly alternate with recessed portions.

* * * * *